United States Patent [19]

Wosegien et al.

[11] 4,019,426
[45] Apr. 26, 1977

[54] HAND BRAKE FOR A BRAKE CYLINDER

[75] Inventors: Bernd Wosegien; Georg Stäuble, both of Munich, Germany

[73] Assignee: Knorr-Bremse GmbH, Munich, Germany

[22] Filed: Nov. 6, 1975

[21] Appl. No.: 629,662

[30] Foreign Application Priority Data

Nov. 12, 1974 Germany ............................ 2453497

[52] U.S. Cl. .................................. 92/113; 92/129; 92/130 R; 188/106 F
[51] Int. Cl.² ...................... F01B 31/00; F16J 1/10
[58] Field of Search .............. 92/130 R, 129, 114, 92/13, 113; 188/106 F; 74/625, 126, 130

[56] References Cited

UNITED STATES PATENTS

| | | | |
|---|---|---|---|
| 1,715,406 | 6/1929 | Christenson | 92/130 R |
| 2,251,893 | 8/1941 | Snell | 74/130 |
| 3,062,591 | 11/1962 | Brimhall | 92/130 R |
| 3,589,480 | 6/1971 | Axelsson | 92/114 |
| 3,638,763 | 2/1972 | Laverdant | 188/106 F |
| 3,805,924 | 4/1974 | Gamberdella | 188/106 F |

*Primary Examiner*—Paul E. Maslousky
*Attorney, Agent, or Firm*—Edmund M. Jaskiewicz

[57] ABSTRACT

A hand brake for manually actuating brake cylinders, particularly for an air braking system on railway vehicles, has a piston tube extending from the piston of a brake cylinder and an actuating rod connected to the brake linkage positioned within the piston tube. A device for adjusting the actuating rod with respect to the piston tube device comprises a thrust ring acting upon a portion of the piston tube. A brake ring is positioned around the piston tube and is rotatable by a manually actuated drive. Wedge gear displacing means are provided to displace axially the brake ring upon rotation of the brake ring. An intermediate element is connected to the piston tube and is displaced by the brake ring during axial displacement of the brake ring. The piston tube has a cam portion acting upon the thrust ring so as to displace the actuating rod axially upon axial displacement of the piston tube.

8 Claims, 4 Drawing Figures

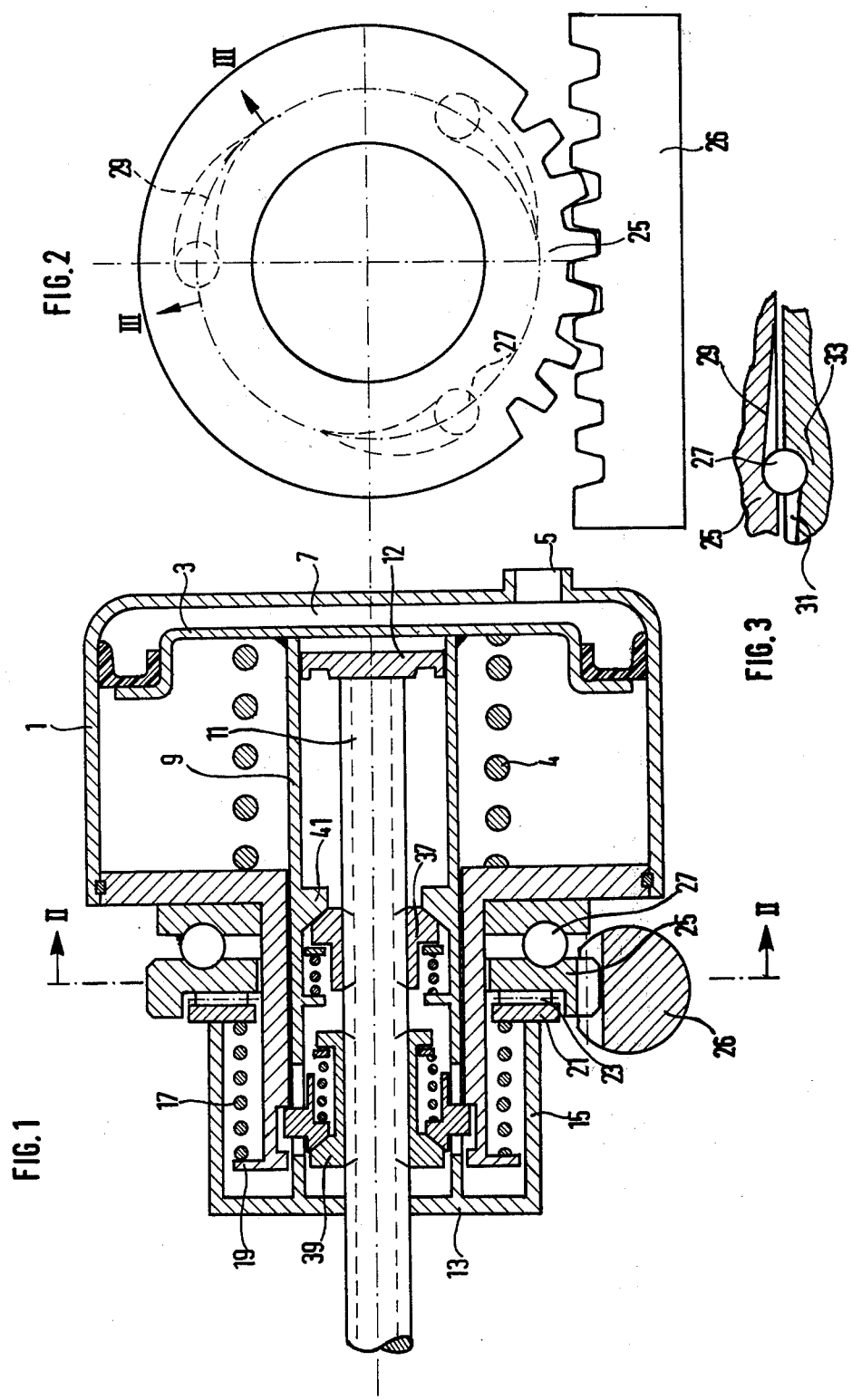

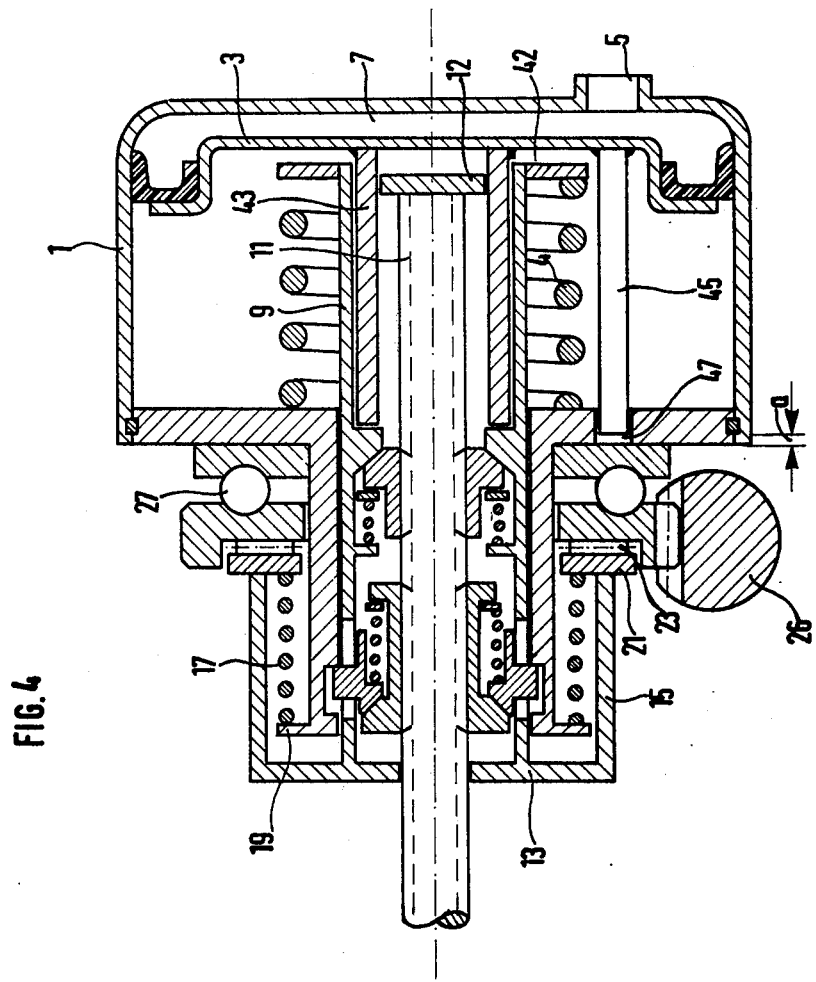

HAND BRAKE FOR A BRAKE CYLINDER

The present invention relates to brake cylinders such as air brake cylinders on railway vehicles, more particularly, to structure for actuating manually the brake cylinder.

Under certain operating conditions it is desirable that the brake cylinders such as employed in air braking systems on railway vehicles be operable by hand. Such manually operable brake cylinders generally comprise some form of a brake spindle shaft having various bars, intermediate levers and pull rods in order to actuate the brake linkage. In order to maintain the compressed air for the service brake independent of the hand brake, the hand brake actuating rod is generally engagable with the brake linkage by means of a loop or other structure providing for play or clearance.

Although the cost of manufacturing known hand brakes has been increasing the danger of defect or failure in the brake mechanism still exists. Further, because of the number of intermediate parts and components which must be used a certain play will be encountered in the hand brake device when it is manually operated. The existence of such play prevents direct actuation of the brake linkage actuating rod upon manipulation of the hand brake.

It is therefore the principal object of the present invention to provide a novel and improved hand brake for brake cylinders such as employed on railway vehicles.

It is another object of the present invention to provide such a hand brake which acts directly upon the actuating rod of the brake cylinder and wherein movement of the hand brake device is not affected by lost motion or play.

It is a further object of the present invention to provide such a hand brake which will avoid a cumulative effect of forces produced by actuation of the hand brake and forces produced by the compressed air brake.

The objects of the present invention are achieved by providing a brake ring externally around the piston tube and rotatable by a hand operated drive. Rotation of the brake ring engages wedge gearing means to displace the brake ring in an axial direction. An intermediate element connected to the brake ring is moved by axial displacement of the brake ring and a cam on the piston tube engages a thrust ring on the adjustment device to axially displace the actuating rod.

According to one aspect of the present invention a brake cylinder has a piston reciprocable therein and a piston tube extends from the piston outwardly of the cylinder. An actuating rod is slidably positioned within the piston tube and extends outwardly of the tube for connection to brake linkage. In order to adjust the actuating rod with respect to the piston tube there is provided means which may include a thrust ring acting upon a cam portion of the piston tube. A brake ring is rotatably mounted around the piston tube and acts against an intermediate element which is connected to the piston tube. The brake ring is rotatable by manually operated drive means engagable therewith. Wedge gear means act upon the brake ring to displace the brake ring axially when the brake ring is rotated. The axial displacement of the brake ring will displace axially the intermediate element and the piston tube connected with the intermediate element such that the cam portion of the piston tube will act upon the thrust ring to displace axially the actuating rod whereby the brake linkage is operated.

The hand brake according to the present invention may also be constructed so as to avoid any addition of the forces applied by actuating the hand device and the forces normally produced by the service or compressed air brake. Such structure may comprise a plurality of locking rods attached to the piston and extending from the piston through bores in an end wall of the brake cylinder housing to engage a supporting ring in the locking position. The supporting ring is positioned adjacent the cylinder end wall and the wedge gear means is disposed between the supporting ring and the manually operated brake ring. In addition, there is a cam tube extending from the piston to the cam portion on the piston tube and a spring acts upon the piston tube to load the piston tube toward the piston. The advantages of the present invention are that the hand brake has a very compact nd simplified structure when employed in conjunction with the service brake. Utilizing a minimum of interposed components, the hand brake acts on the actuating rod of the brake cylinder similar to the operation of the service brake which acts upon the thrust ring which in turn acts upon the actuating rod. Piston is provided with counter elements in the form of locking rods that may act on the hand brake device during its operation in order to prevent any cumulative effect of the service brake and the hand brake. Such an addition of forces could readily lead to damage to the brake cylinder.

Other objects and advantages of the present invention will be apparent from the accompanying description when taken in conjunction with the following drawings, which are exemplary, wherein;

FIG. 1 is a longitudinal section view through a brake cylinder incorporating the hand brake structure according to the present invention;

FIG. 2 is a sectional view taken along line II-II of FIG. 1;

FIG. 3 is a sectional view taken along the line III-III of FIG. 2 to illustrate the details of the ball and groove wedge gear displacing means; and, FIG. 4 is a view similar to that of FIG. 1 and showing the hand brake device incorporating a device for preventing the addition of forces according to the present invention.

Proceeding next to the drawings wherein like reference symbols indicate the same parts throughout the various views, a specific embodiment and modifications of the present invention will be described in detail.

A brake cylinder of a fluid pressure braking system as employed on railway vehicles is indicated in FIG. 1 and comprises a cylinder housing 1 having an end wall 2 and a tubular extension 6 extending axially therefrom. Reciprocably positioned within the cylinder 1 is a piston 3 having peripheral sealing or packing structure as known in the art. The piston is acted upon by a fluid pressure medium, such as compressed air, which is introduced through a connection 5 into chamber 7 of the brake cylinder and returned to its initial or release position by return spring 4.

As viewed in FIG. 1, extending from the left side of the piston is a piston tube 9 which is slidably supported in the tubular extension 6 and extends outwardly thereof. An end plate 13 is provided on the extreme end of the piston tube 9. The piston tube 9 is welded to the piston 3 or may be made in one piece with the piston 3 so as to be integral therewith. An actuating rod 11 is slidably positioned within the piston tube 9 by means of a head 12 which is slidably engageable with the inner wall of the piston tube 9. The other or left end of actuating rod 11 as viewed in FIG. 1 is connected in a known manner to brake linkage for actuating the brakes on the vehicle.

The actuating rod 11 is slidably received through an opening in the end wall 13 of the piston tube. A tubular intermediate element 15 is connected to the end wall 13 and has a diameter greater than that of the piston tube 9. The intermediate element 15 extends from the end wall 13 back toward the cylinder 1 as can be seen in FIG. 1. A compression spring 17 is positioned between an external flange 19 on the end of tubular extension 6 and an intermediate ring 21 located at the open end of intermediate element 15. On the other side of the intermediate ring 21 there are arranged a plurality of roller elements 23 against which is rotatably mounted a manually operable brake ring 25. The roller elements 23 are urged against the brake ring 21 by means of the compression spring 17 acting against the intermediate ring 21. Rollers may be employed in place of roller elements 23.

The brake ring 25 is provided with gear teeth about its outer periphery and these teeth mesh with a rack 26 which is manually operable in such a manner that linear movement of the rack 26 will rotate the brake ring 25.

According to the present invention, other drives may be employed to produce relative displacement of the handbrake ring 25 in place of the rack 26 meshing with the peripheral gear teeth of the ring 25.

A supporting ring 33 is positioned upon the end wall 2 of the brake cylinder housing 1 so as to be opposed from the face of the brake ring 25 which is away from the roller elements 23. A plurality of pairs of grooves 29 and 31 are formed in the opposed faces of brake ring 25 and supporting ring 33 respectively and these grooves extend circumferentially in opposite directions as will be apparent from FIGS. 2 and 3. The depth of each groove gradually decreases from a maximum at points which are opposite from each other so as to form cam surfaces as may be seen in FIG. 3. Balls 27 are positioned in the pairs of opposed grooves. The balls 27 and grooves 29,31 form a wedge gear displacing structure such that upon rotation of the brake ring 25 the brake ring will be displaced toward the left as viewed in FIG. 1. This will be apparent from FIG. 3 wherein movement toward the left of brake ring 25 will cause the brake ring to be displaced away from the supporting ring 33. This axial displacement toward the left of brake ring 25 will act via roller elements 23 against intermediate ring 21 so as to compress spring 17 and to displace intermediate element 15 toward the left which, through end wall 13, will similarly displace piston tube 9 toward the left. The actuating rod 11 is provided with a reversible thread upon which is mounted an adjustment device of a known structure comprising a thrust ring 37 and an advance nut 39. Thrust ring 37 is provided with a conical coupling surface which frictionally engages with a correspondingly shaped surface on a cam portion 41 formed on the inner wall of piston tube 9.

When the brake cylinder is operated in the normal manner as a service brake by introducing compressed air into the chamber 7, the piston 3 and the piston tube 9 attached to the piston 3 will be displaced toward the left as seen in FIG. 1 so that after a very small displacement the cam 41 will act upon the thrust ring 37. When the coupling surfaces on thrust ring 37 and cam 41 are engaged, the thrust ring 37 will be held against rotation upon the threaded actuation rod 11 and will therefore cause the rod 11 to move toward the left. The movement of the rod 11 toward the left will operate the brakes of the vehicle through brake linkage in a known manner. The forward and backward movements of the actuating rod 11 will bring about operation of the adjustment device 37 and 39 in a known manner.

When it is desired to utilize the hand brake of the present invention, the brake ring 25 will be rotated by moving the rack 26 meshing therewith so that the brake ring 25 will be displaced to the left and will act on the intermediate element 15 which is connected to the piston tube 9. As described above, the movement of the brake ring 25 will be transmitted through the roller elements 23 and intermediate ring 21. This movement toward the left will engage the coupling surfaces on cam 41 and thrust ring 37 so that the actuating rod 11 will be displaced toward the left as described above to operate the brakes.

In FIG. 4 there is illustrated a hand brake device which is substantially similar to the structure shown in FIG. 1 but is provided with additional structure to prevent the addition of forces by preventing actuation of the service or air brake when the hand brake is operated. In the modification of FIG. 4, the piston tube 9 is separate from and not attached to the piston 3 but on the end of the piston tube 9 directed toward the piston 3 there is formed an external flange 42. Return spring 4 acts between the flange 42 and the inner surface of cylinder end wall 2 to return the piston tube 9 into its original or starting position when pressure is removed from the chamber 7.

Within the piston tube 9 there is a cam tube 43 which extends axially from the piston 3 and may be integral therewith or suitably attached thereto such as by welding. In the initial or release position of the brake cylinder, the cam tube 43 is at a certain distance from the cam 41. Displacement of the piston 3 under the action of a pressure fluid in chamber 7 will cause the end of cam tube 43 to engage cam portion 41 which will then engage thrust ring 37 with its coupling surface. The piston 3, cam tube 43 and piston tube 9 thus define a displaceable unit when the cam 41 is engaged which will then displace actuating rod 11 by means of the thrust nut 37 which is secured against rotation to operate the brakes on the vehicle. When pressure is removed from the chamber 7, the piston 3 will be returned to its initial or release position under the action of return spring 4.

The device of FIG. 4 is also provided with locking rods 45 positioned radially outwardly of spring 4 and are welded to the piston 3 so as to extend axially therefrom and to project through bores 47 formed in end wall 2 so as to contact supporting ring 33 during axial displacement of piston 3.

To operate the hand brake of FIG. 4, the brake ring 25 will be rotated which will cause the brake ring 25 to move away from supporting ring 33. This movement of brake ring 25 will displace intermediate element 15 and piston tube 9 connected thereto so that the cam 41 will shift the actuating rod 11 in an axial direction by engagement with the thrust ring 37. The hand brake is now in the applied position. If in this position of the hand brake fluid pressure will be applied against piston 3, the locking rods 45 will engage the supporting ring 33 and will prevent any additional displacement of the piston 3. This additional displacement would exert an additional effect on the actuating rod 11. When compressed air is introduced into the chamber 7, piston 3 will be displaced a short distance indicated at *a* until the ends of the locking rods 45 contact supporting ring 33. This will prevent further axial shifting of the piston 3. Since the cam 41 was also displaced to the left from the position shown in FIG. 4 through the actuation of the hand brake, any contact between the cam tube 43 and cam 41 will be prevented. Accordingly, the locking rods 45 can freely move a short distance *a* but any accumulative or adding effect of braking forces will not occur.

It may occur that fluid pressure acting against piston 3 will cause the locking rods 45 to exert an axial force against supporting ring 33 which exceeds the counterforce exerted by the brake ring 25 through bores 47 against supporting ring 33 and the rotational position of the brake ring 25 remains fixed. The force applied by piston 3 as a larger force can be transmitted without the addition or cumulative effect of forces by means of the hand brake device acting as a unit. Under these circumstances, the entire hand brake device including the supporting ring 33 will be displaced toward the left as seen in FIG. 4 and will act on the actuating rod 11 in the manner as described above through piston tube 9, cam 41 and thrust ring 37 so that the actuating rod 11 will be displaced.

However, should the brake ring 25 not remain fixed against rotation, the resistance of the brake ring 25 and supporting ring 33 can be completely or partially eliminated upon the occurrence of a force on piston 3 which is greater than the counterforce of the hand brake. The effect of the hand brake is eliminated by a direct action of the piston 3 on piston tube 9 and thrust nut 37 on the actuating rod 11. Thus, an addition of forces of the hand brake and the service brake cannot occur. The play or clearances between the several components which determine the action of the hand brake and the service brake can be so selected with respect to each other that no reciprocal effect will be exerted when either the hand brake or service brake is operated.

It should be borne in mind that the hand brake as described and illustrated in FIGS. 1 and 4 is not limited to the brake cylinder illustrated herein but that a return spring cylinder may be used instead of the above described brake cylinder.

Thus it can be seen that the present invention provides a hand brake device for brake cylinders generally used on railway vehicles in air braking systems which is simple in construction, reliable in operation and prevents an accumulative or additive effect of forces by the hand brake and service brake.

It will be understood that this invention is susceptible to modification in order to adapt it to different usages and conditions, and accordingly, it is desired to comprehend such modifications within this invention as may fall within the scope of appended claims.

What is claimed is:

1. In a brake cylinder, the combination of a cylinder having a piston reciprocable therein, a piston tube extending from said piston outwardly of said cylinder, an actuating rod slidably positioned within said piston tube and extending outwardly thereof for connection to a brake linkage, means including a thrust ring acting upon a portion of said piston tube for adjusting said actuating rod with respect to said piston tube, an intermediate element connected to said piston tube, a brake ring rotatably mounted around said piston tube and axially displaceable toward said intermediate element, means engaging said brake ring for manually rotating said brake ring, wedge gear means acting upon said brake ring for displacing said brake ring axially upon rotation thereof, said axial displacement of said brake ring axially displacing said intermediate element and connected piston tube such that said tube portion acts upon said thrust ring to displace axially said actuating rod to operate brake linkage which is connected to said actuating rod.

2. In a brake cylinder as claimed in claim 1 wherein said brake ring has gear teeth on the periphery thereof, said rotating means comprises a rack meshing with said brake ring gear teeth.

3. In a brake cylinder as claimed in claim 1 and a supporting ring on an end wall of said cylinder and parallel to said brake ring, said wedge gear means being disposed between said supporting ring and said brake ring.

4. In a brake cylinder as claimed in claim 3 and roller elements between said intermediate element and the face of said brake ring away from said supporting ring.

5. In a brake cylinder as claimed in claim 4 and an intermediate ring between said intermediate element and said brake ring, said roller elements being between said intermediate ring and said brake ring, said intermediate ring acting upon said intermediate element upon axial displacement of said brake ring.

6. In a brake cylinder as claimed in claim 3 wherein said wedge gear displacing means comprises a plurality of pairs of opposed grooves on the opposed faces of said supporting ring and brake ring, the grooves in one ring extending circumferentially in a direction opposite from the grooves in the other ring and said grooves gradually decreasing in depth in said respective directions to define cam surfaces, and balls in said pairs of opposed grooves.

7. In a brake cylinder as claimed in claim 3 and locking rods extending axially from said piston through openings in an end wall of said cylinder and engagable with said supporting ring, a cam tube having one end attached to said piston and extending within said piston tube to said piston tube portion, the end of said piston tube directed toward said piston having a flange thereon, and a spring acting upon said flange to load said piston tube toward said piston.

8. In a brake cylinder as claimed in claim 1 and said thrust ring having a coupling surface thereon, and means on the inner wall of said piston tube for defining a cam surface engagable with said thrust ring coupling surface.

* * * * *